United States Patent Office
3,359,831
Patented Dec. 26, 1967

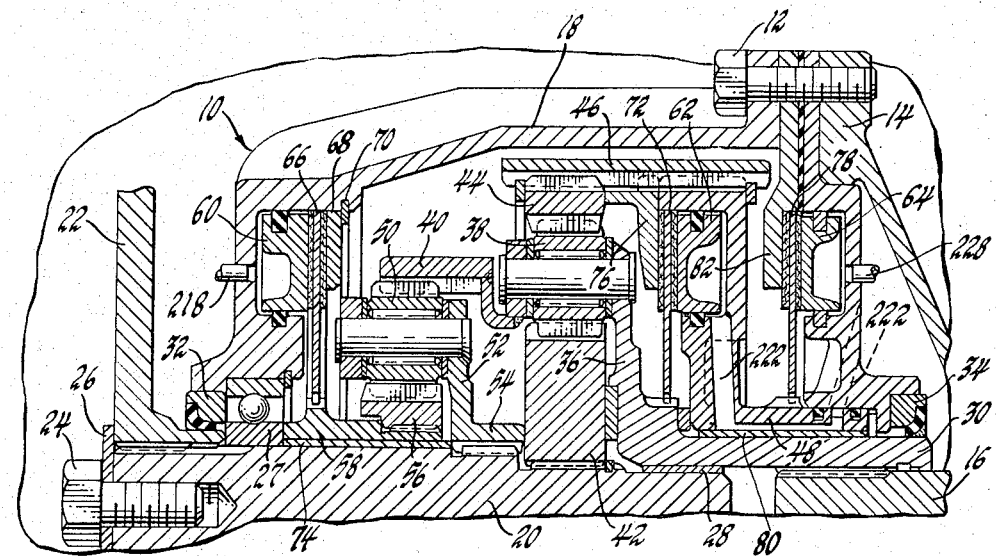

3,359,831
MULTIPLE SPEED FAN DRIVE
Milton H. Scheiter, Bloomfield Hills, Mich., assignor to General Motors Corporation, Detroit, Mich., a corporation of Delaware
Filed May 20, 1965, Ser. No. 457,434
15 Claims. (Cl. 74—761)

ABSTRACT OF THE DISCLOSURE

A fan drive unit incorporating a planetary gear set which provides a plurality of gear ratios in response to the change in temperature of the engine coolant.

This invention relates to fan drives and more particularly to a drive adapted to be connected to a vehicle engine crankshaft for operating a cooling fan at variable speeds depending upon the temperature of the liquid to be cooled and the speed of the engine.

The ideal fan drive would be an infinitely variable unit having a rate of rotation range from an overdrive when the engine is idling to an underdrive when the engine is accelerating such that the fan speed would rotate at a constant revolution per minute rate. Although the use of an infintely variable ratio device for driving a fan would be ideal, such a device would be too costly for most operations. With the cost factor in mind, the present stepped ratio unit was designed for use in driving a cooling fan. To control the various rates of the drive unit, a temperature sensitive pressure control system which is responsive to the temperature of the liquid to be cooled and to the engine speed was developed.

An object of this invention is to provide a stepped fan drive unit with gear sets that provide an overdrive, an underdrive and a direct drive connection between a cooling fan and engine crankshaft.

Another object of this invention is to provide a control unit for the fan drive unit that will control the engagement of the proper gear set depending upon the temperature of the cooled media and having an overriding control dependent upon the engine speed for preventing excessive fan speeds.

A further object of this invention is to provide a set of three interdependent valves for controlling the actuation of the three gear sets of the fan drive unit such that only one set of gears will be operable at any one time.

Another object of this invention is to provide a temperature sensitive unit actuated by the liquid to be cooled that will control the pressure of the oil delivered to the three valves of the control unit for selectively actuating the valves by the appropriate pressure whereby the various gear sets may be engaged for transmitting power from the vehicle engine to the output shaft supporting and rotating the cooling fan.

A further object of this invention is to provide a control unit that will not connect any gear trains for transmitting power from the input shaft to drive the fan unless the liquid to be cooled has been heated to a predetermined temperature.

These and other objects of this invention may be readily seen by reference to the following specification and the following drawings wherein:

FIGURE 1 is a longitudinal sectional view through an accessory drive unit construction in accordance with the principle of this invention with some portions cut away.

FIGURE 2 is a schematic diagram illustrating a temperature sensitive transducer that thermostatically controls a variable pressure unit supplying liquid under variable pressures to the three actuating values for controlling the fan drive unit.

Referring now to the drawings, as best seen in FIGURE 1, a fan drive unit indicated generally by the numeral 10 is secured by bolts 12 to an engine adapter flange 14 of an engine block (not shown). The fan drive unit 10 is aligned with the crankshaft 16 of the engine.

The fan drive unit 10 includes a housing 18 in which is journaled an output shaft 20 having a cooling fan 22 splined on one end thereof and secured thereon by a bolt 24 and washer 26. Adjacent the fan 22 the one end of output shaft 20 is rotatably supported in the housing 18 by a roller bearing 27. The other end of the output shaft 20 is rotatably supported in a sleeve bushing 28 secured in a sleeve 30 that is splined to the crankshaft 16 for rotation therewith. Seals 32 and 34 are positioned respectively between the housing 18 and the hub of cooling fan 22 and the housing 18 and the sleeve 30.

Power is transmitted from the rotating crankshaft 16 to the gear sets of the fan drive unit 10 by the sleeve 30 which has a pinion carrier 36 extending therefrom for rotatably supporting a planet pinion 38 and a ring gear 40. The planet pinion 38 is meshingly engaged with a sun gear 42 that is splined to the output shaft 20. The planet pinion 38 is also meshingly engaged with a ring gear 44 that is splined to the drum 46 supported on a sleeve 48 that is rotatably supported by bushing 80 on the outside of the sleeve 30.

The ring gear 40 is meshingly engaged with planet pinion 50 which is journaled for rotation in pinion carrier 52 of sleeve 54 that is splined to the output shaft 20 for rotation therewith. A sun gear 56 is also meshingly engaged with planet pinion 50 and is secured to a sleeve 58 that is rotatably supported on the output shaft 20 by bushing 74.

Three fluid pressure actuation responsive servos 60, 62 and 64 are utilized to control the actuation of the various gear sets. A brake disc 66 is secured to sleeve 58. The brake disc 66 is positioned between actuation servo 60 and brake backing 68 which is secured to the housing 18 by snap ring 70. Upon actuation of servo 60 the brake disc 66 is prevented from rotating which in turn prevents sleeve 58 from rotating and also secures sun gear 56 from movement. The sun gear 56 then becomes the reaction point for the system such that planet pinion 50 rotates about sun gear 56 in the same direction of rotation as the input to the ring gear 40 from shaft 16, sleeve 30 and carrier 36, and thus rotates carrier 52, sleeve 54 and output shaft 20 causing the fan 22 to rotate at an underdrive rate compared to the rotation of the input or crankshaft 16.

A clutch disc 72 is secured to sleeve 30 for rotation therewith. The clutch disc 72 is positioned between fluid pressure actuation responsive servo 62 and a clutch backing 76 extending inward from drum 46. Upon actuation of servo 62 the clutch disc 72 is engaged to rotatable drum 46, thereby locking ring gear 44 to carrier 36 to establish direct drive of the gear units, output shaft 20 and fan 22.

A brake disc 78 is secured to sleeve 48 for rotation therewith on bushing 80. The brake disc 78 is positioned between fluid pressure actuation responsive servo 64 and brake backing 82 attached to the housing 18 such that when servo 64 is actuated, the brake disc 78 is secured from rotation between servo 64 and arm 82. With the actuation of servo 64, sleeve 48 is prevented from rotating with sleeve 30 such that ring gear 44 becomes a reaction point for the system such that planet pinion 38 walks about ring gear 44 and drives sun gear 42 at an overdrive rate in the same direction as input ring gear 44, such that the fan 22 is driven by the output shaft 20 at a greater rate than that of input shaft 16.

Thus, it can be seen that by actuating selected units of the fluid pressure actuation responsive servos, either an underdrive, direct drive or overdrive set of gears may be engaged to propel the fans at the selected rate.

Referring now to FIGURE 2, the control unit for the fan drive indicated generally by the numeral 84 is schematically shown. Any satisfactory fluid could be used to actuate the various valves and servos in this device but for ease of explanation we shall refer to such fluid as oil. The control unit 84 includes three control valves 86, 88 and 90 which control the flow of oil under pressure to the three fluid pressure actuation responsive servos 60, 62 and 64, respectively.

A temperature sensitive transducer 92 is connected to the line 94 used to carry the fluid to be cooled to the cooler as indicated by the direction of the arrows. The temperature sensitive transducer may be of any conventional thermally responsive control such as a bimetallic coil that moves a plunger 92a lineally in response to a temperature change.

A variable pressure metering valve 96 is controlled by the temperature sensitive transducer 92 and supplies oil under varying pressures to the control valves 86, 88 and 90 by means of oil line 98. The oil under pressure is provided from a pressure source (not shown) and is delivered to the variable pressure valve 96 by a pressure supply passage 100.

The variable pressure valve 96 includes a housing 102, a valve 104 having a pair of lands 106 and 108 connected by a reduced area 110 and having a stem 112 extending from land 106 to contact the temperature sensitive transducer plunger 92a for moving the valve in response to movement of the temperature sensitive transducer. The valve 104 is mounted in a cylinder 114 of the housing 102 for reciprocal movement therein. A compression spring 116 bears against one end of the cylinder 114 and against one end of the land 108 whereby the valve 104 is biased toward the temperature sensitive transducer such that the stem 112 contacts the temperature sensitive transducer plunger 92a all times.

A chamber 118 is formed by the cylinder 114 and the space between lands 106, 108 about the reduced section 110. A second chamber 120 is formed between the end of land 108 and the end of cylinder 114 wherein the compression spring 116 is located. An oil passage 122 extends between chambers 118 and 120 from the reduced area 110 through the center of the valve 104 for a purpose to be explained later. The oil line 100 is connected to an oil passage 124 formed in the wall of cylinder 114 adjacent land 108. When the liquid to be cooled has been cooled to a predetermined temperature, the variable pressure valve 96 will be in the positions shown in FIGURE 2. In this position the land 108 of the valve 104 extends above passage 124 and blocks any entry of line pressure to the chamber 118. An exhaust passage 126 formed in the wall of cylinder 114 adjacent land 106 leads to exhaust for the chamber 118 so that it may exhaust when the liquid to be cooled has been cooled to the predetermined temperature. The oil line 98 is connected to the chamber 118 so that any pressure in chamber 118 is transmitted to the various valves 86, 88 and 90.

As the liquid temperature going to the cooler rises above the predetermined temperature, a plunger 92a exerts a lineal force against the stem 112 until the force of the compression spring 116 is overcome and the valve 104 moved away from the transducer 92. Such movement moves land 106 to block exhaust 126 and land 108 to open chamber 118 to line pressure from oil line 100 through passage 124. When chamber 118 is filled, the oil flows through passage 122 into chamber 120 so that the fluid pressure is effective on the area of land 108 to assist the biasing action of spring 116 urging the valve against plunger 92a. This continual change of biasing force on the valve causes a searching action by the valve which provides increasing pressure in oil line 98 as the temperature of the liquid to be cooled rises until the valve 104, at some relatively high pressure, is continuously held open to allow full line pressure to pass through chamber 118 to line 98. At temperatures between a relatively cold temperature and a predetermined high temperature, the pressure delivered to passage 98 will rise with increase in temperature of the temperature responsive transducer.

The control valve indicated generally at 86 consists of a valve body 130 providing a stepp cylindrical bore having three distinct portions with different diameters 132, 134, 136 formed therein for receiving a valve 138 having three separated stem portions 140, 142 and 144. The valve also includes a small land portion 146 designed for a slip fit in a cylinder portion 132 and a larger land portion 148 designed for a slip fit in a cylinder portion 134. The stem portion 140 extends from land 146 for contacting the end of cylinder portion 132 and limits movement of the valve 138 in that direction. The stem portion 144 extends from the larger land 148 through a partition 150 into a chamber 152 formed by the cylindrical portion 136. The stem portion 142 is located between land portions 146 and 148. A seal 151 is positioned in the partition 150 about stem portion 144 preventing fluid flow between cylinder portions 134 and 136. A compression spring 154 is positioned about stem portion 144 and between the larger land 148 and the partition 150 for biasing the valve 138 into contact with the end of chamber 132. A free floating piston 156 is slidably positioned in the largest cylinder portion 136 and abuts stem portion 144 for movement in one direction thereby.

The second control valve indicated generally at 88 is similar to the control valve 86 and consists of a valve body 158 which provides a two-stepped cylindrical bore 160, 162 formed therein for receiving a valve 164 consisting of three reduced stem portions 166, 168 and 170 and two land portions 172, 174. The smaller land portion 172 is positioned between stem portions 166 and 168 and designed for a slip fit in cylinder portion 160. The larger land portion 174 is positioned between stem portions 168, 170 and is sized for a slip fit in cylinder portion 162. The stem 166 extends from land portion 172 and is positioned to abut the end of cylinder portion 160 limiting movement of the valve 164 in that direction. The stem portion 170 extends from the land 174 and limits movement of the valve in that direction by contacting the end of cylinder portion 162. A coil spring 176 is positioned about stem portion 170 and between land 174 and the end of the cylinder portion 162 for biasing the valve 164 towards the end of cylinder 160, as seen in FIGURE 2.

The third control valve indicated generally at 90 is formed in the same manner as the second control valve 88. Valve 90 has a valve body 178 which provides a two-stepped cylindrical bore 180, 182 formed therein for receiving a valve 184 consisting of three reduced stem portions 186, 188 and 190 and two land portions 192, 194. The smaller land portion 192 is positioned between stem portions 186 and 188 and designed for a slip fit in cylinder portion 180. The larger land portion 194 is positioned between stem portions 188 and 190 and is sized for a slip fit in cylinder portion 182. The stem portion 186 extends from land portion 192 and is positioned to abut the end of cylinder portion 180, limiting movement of the valve 184 in that direction. The stem portion 190 extends from a land 194 and limits movement of the valve 184 in that direction by contacting the end of cylinder portion 182. A coil spring 196 is positioned about stem portion 190 and between land 194 in the end of the cylinder portion 182, for biasing valve 184 toward the end of the cylinder 180, as seen in FIGURE 2.

The three control valves 86, 88 and 90 are connected to the variable pressure metering valve 96 by the oil line 98. The oil line 98 leads to the respective chambers 198, 200 and 202 formed between the end of the smaller diameter cylindrical bores 132, 160 and 180 and the respective smaller lands 146, 172 and 192. The oil line 100 is connected to each control valve through ports 204, 206, 208 formed in the walls of the cylindrical portions 134, 162 and 182, respectively.

When the liquid to be cooled has been cooled to a predetermined temperature or is cool at start-up, the variable pressure valve 96 and the three control valves 86, 88 and 90 are also in the position shown in FIGURE 2 with the large land portions 148, 174 and 194 blocking the entry of oil line pressure from line 100 into the chambers 210, 212 and 214 formed between the respective lands 146–148, 172–174 and 192–194 about the respective stem portions 142, 168 and 188. In this position, the fan drive is in neutral and does not rotate the fan since none of the servos are actuated.

The three compression springs 154, 176 and 196 provide various biasing actions against the respective valves 138, 164 and 184. Spring 154 provides the lightest biasing action against valve 138 and spring 196 provides the heaviest biasing action against valve 184. Therefore, it can be seen that as the line pressure provided by the variable pressure valve 96 to oil line 98 is transmitted to the chambers 198, 200 and 202 and increases from zero to provide a force on land 146 of sufficient magnitude to overcome spring 154, valve 138 of control valve 86 will be the first to move toward the right from the position shown in FIGURE 2. By such movement the smaller land 146 will block the exhaust port 216 of chamber 210 and the large land portion 148 will move to the right in the cylinder 134 allowing the oil line pressure from line 100 to enter chamber 210. The line pressure from oil line 100 acts against the end area of the larger land 148 and assists in further movement of valve 138 to the right until stem portion 144 moves the floating piston 156 against the end of the cylinder 136 limiting movement in that direction. At this point the line pressure will flow from chamber 210 through oil line 218 to the fluid pressure actuation responsive servo 60 for the actuation thereof. Referring now to FIGURE 1, as the servo 60 is actuated, the friction engaging means or brake disc 66 is secured from movement by the action of the servo 60 biasing it against the brake backing 68. With the brake disc 66 secured from movement the sleeve 58 and sun gear 56 are secured from movement and power is transferred from the crankshaft 16 through sleeve 30, arm 36, to the ring gear 40 which drives the planet pinion 50 about the secured sun gear 56 thus transmitting power through arm 52 and sleeve 54 which is secured to the output shaft 20, causing the fan 22 to be rotated at the lowest gear ratio.

As the pressure in oil line 98 is increased by the variable pressure valve 96, pressure in chamber 200 of control valve 88 increases until the spring 176 is overcome, at which time valve 164 moves to the right, as viewed in FIGURE 2. As the valve 164 moves to the right the smaller land 172 blocks the exhaust port 220 of chamber 212 and the larger land 174 unblocks the passage 206 allowing line pressure to enter chamber 212 from oil line 100. As the chamber 212 is filled with the line pressure the larger area of the end of land 174 will assist in moving the valve 164 until stem portion 170 abuts the end of chamber 162 limiting movement in that direction. With the exhaust 220 blocked, the line pressure will flow from chamber 212 through oil line 222. As the oil flows through oil line 222, it enters the chamber 224, formed by the cylindrical bore 134, partition 150 and land 148. The oil line pressure in chamber 224 acting against the area of land 148 causes the valve 138 to move to the left to return to the position shown in FIGURE 2. Such movement of valve 138 causes the land 148 to block the intake of line pressure from line 100 and move the land 146 to open the exhaust port 216 thus reducing the line pressure in 218 and releasing the servo 60 which, in turn, allows the brake 66 to rotate freely releasing sun gear 56 and stopping planet pinion 50 from driving output shaft 58 and fan 22.

The oil line 222 is also connected to the fluid pressure actuating responsive servo 62. As the line pressure actuates servo 62, the friction engaging means or clutch disc 72 is secured between the servo 62 and clutch backing plate 76 thus securing sleeve 48 to 30 for rotation together. With sleeves 48 and 30 rotating together the ring gear 44, planet pinion 38 and sun gear 42 rotate as a unit providing a direct drive between crankshaft 16 and output shaft 20 causing the fan 22 to rotate at the same speed as the crankshaft.

As the temperature of the liquid to be cooled increases further, variable pressure valve 96 causes the pressure in oil line 98 to increase until the pressure in chamber 202 is large enough to overcome the biasing action of spring 196. As valve 184 moves to the right from its position, as seen in FIGURE 2, the smaller land 192 blocks the exhaust port 226 from chamber 214 and the larger land 194 allows line pressure to enter the chamber 214 from line 100.

The line pressure in chamber 214 acts against the end of land 194 and applies additional force to further overcome the spring 196 to move the valve 184 until stem portion 190 contacts the end of the cylinder bore 182 limiting motion of the valve in that direction. The oil also flows from chamber 214 through line 228 to the chamber 230 formed between the land 174 and the end of the cylindrical bore 162. The oil line pressure in chamber 230 acting against the area of the land 174 will bias the valve 164 to move to the left and return to the position shown in FIGURE 2. Such movement of the valve 164 causes the land 174 to block the intake of line pressure from line 100 and move the land 172 to open the exhaust port 220 thus reducing line pressure in oil line 222 and releasing the servo 62 which in turn releases the clutch 72 and allows the sleeves 30 and 48 to move independently of each other and stops the crankshaft 16 from driving the output shaft 20 and fan 22.

Since the movement of valve 164 to the left exhausts the line pressure from line 222, the pressure in chamber 224, holding the valve 138 in its left most position, as seen in FIGURE 2, is exhausted. However, the line 228 is connected to the chamber 232 formed by the free floating piston 156 and the end of cylinder bore 136 so that when the line pressure is introduced to the line 228 the valve 138 will be maintained in its left most position by the line pressure acting on the floating piston 156 biasing the valve 138 through stem portion 144.

The line 228 is also connected to the fluid pressure actuation responsive servo 64 for the actuation thereof. Referring now to FIGURE 1, as the servo 64 is actuated, the friction engaging means or brake disc 78 is secured from movement by the action of the servo 64 biasing it against the brake backing 82. With the brake disc 78 secured from movement, the sleeve 48 and ring gear 44 secured thereto are secured from movement and power is transferred from the crankshaft 16 through sleeve 30, arm 36, to the planet pinion 38 which rotates on the secured ring gear 44 thus driving the sun gear 42 at an increased or overdrive rate which in turn drives the output shaft 20 and fan 22.

To prevent excessive fan speeds in overdrive gear ratio in the event that the engine speed should increase to a predetermined engine speed prior to the liquid to be cooled reaching a low enough temperature to reduce the gear ratio from the overdrive position, a fluid governor responsive to the engine speed is connected to the oil line 234 which in turn is connected to chamber 236 formed by the land 194 and the back of cylinder bore 182 for controlling valve 184. The pressure from the fluid governor plus the spring 196 would be sufficient to move the valve 184 to the position shown in FIGURE 2, thus blocking line pressure from chamber 214 and allowing the line pressure in chamber 214 to the exhaust through port 226 and permitting valve 164 to actuate the direct drive gear train as previously described, thus protecting the fan from excessive speeds. The governor (not shown) may be of conventional construction to increase governor pressure in passage 230 with increase in engine speed.

While but one embodiment of the subject fan drive and controls has been shown and described, it will be obvious that rearrangement of parts may be made without departing from the spirit and scope of the following claims.

I claim:

1. A control system for controlling the speed of a cooling fan including a rotatable input shaft, means for rotating said input shaft, an output shaft, a fan secured to said output shaft, a planetary gear unit having a plurality of gear ratios operably interconnecting said shafts for transmitting rotational movement of said input shaft to said output shaft, a first frictional drive for establishing a drive through said planetary gear unit that decreases the rotational rate of said input shaft during transmission to said output shaft, a second frictional drive establishing a drive through said planetary gear unit that directly transmits movement of said input shaft to said output shaft, and a third frictional drive establishing a drive through said planetary gear unit that increases the rotational rate of said input shaft during transmission to said output shaft, thermosensitive control means for selectively activating said first, second and third frictional drives for interconnecting said input shafts to said output shaft, said thermosensitive control means comprising a source of fluid under pressure, three control valves, and a thermosensitive control valve for metering said fluid for varying pressure to said three control valves for selectively activating one of said friction drives dependent upon the temperature of the object to be cooled.

2. A drive unit for transmitting rotative motion from an input shaft to an output shaft, said drive unit including a housing, an output shaft journaled in said housing for rotative motion and having one end extending therefrom into said housing, a first sleeve having one end splined to the said input shaft within said housing and the other end rotatably supporting the other end of said output shaft, an arm of said first sleeve extending radially thereof and supporting a first ring gear and a first pinion carrier having a first pinion journaled therein, a first sun gear in meshing engagement with said first planet pinion and secured to said output shaft for rotation therewith, a second sleeve secured to said output shaft for rotation therewith, said second sleeve having an arm extending radially therefrom and supporting a second pinion carrier having a second planet pinion journaled thereon, said second planet pinion being in meshing engagemet with said first ring gear, a third sleeve rotatably supported on said output shaft having a second sun gear secured thereto for rotation therewith, said second sun gear being in meshing engagement with said second planet pinion, friction engaging means for securing said second sleeve from rotating, a third sleeve rotatably mounted on said first sleeve, said third sleeve having an arm extending radially therefrom, a second ring gear in meshing engagement with said first planet pinion and supported on said last named arm, friction engaging means for selectively securing said third sleeve from rotating with said first sleeve and for securing said third sleeve to said first sleeve for rotation therewith, and control means for selectively actuating said friction engaging means, said control means includes a first, second and third pressure sensitive valve operatively connected to the respective friction engaging means for selectively actuating each of said friction engaging means, each of said pressure sensitive valves being responsive to a different pressure for actuation thereof, said valves beging interconnected for blocking the actuation of either unactuated friction engaging means while one of said friction engaging means is actuated and a source of fluid under pressure for actuation of said valves.

3. Apparatus as claimed in claim 2 having a variable pressure valve responsive to a function of said drive unit, said variable pressure valve supplying said pressurized fluid to said control valves under varying pressures dependent upon the function of said drive unit for selectively actuating said control valves whereby said friction engaging means are actuated and deactivated for engaging selected gears of the drive unit.

4. In combination, an engine having a crankshaft, liquid for cooling said engine and a fan for cooling said liquid, a variable speed drive for driving said cooling fan, said drive comprising, a housing secured to said engine, an output shaft journaled in said housing having said fan secured thereto for rotation therewith, a first sun gear and a first sleeve member secured to said output shaft for rotation therewith, said output shaft also having a second sleeve member rotatably supported thereon, said second sleeve member having a second sun gear secured thereto for rotation therewith, a third sleeve member having one end secured to said crankshaft for rotation therewith and the other end extending into said housing, said other end of said third sleeve rotatably supporting one end of said output shaft, said other end of said third sleeve also supporting a first planet carrier and a first ring gear radially spaced from said output shaft, said first planet carrier having a first planet pinion rotatably supported thereon, said first planet pinion being meshably engaged with said first sun gear, said second sleeve member supporting a second planet carrier radially spaced from said output shaft, said second planet carrier having a second planet pinion gear rotatably supported thereon, said second pinion gear being meshably engaged with said first ring gear and said second sun gear, a fourth sleeve member rotatably supported on said third sleeve member, said fourth sleeve member supporting a second ring gear in meshing engagement with said first planet pinion gear, a first friction engaging means for securing said first sleeve member to said housing for preventing movement of said first sleeve member, a second friction engaging means for securing said fourth sleeve member to said third sleeve member for movement thereof together, a third friction engaging means for securing said fourth sleeve member to said housing for preventing movement of said fourth sleeve member and control means responsive to the temperature of said liquid for selectively actuating said friction engaging means for connecting said crankshaft to said output shaft whereby, for any given speed of the crankshaft, the speed of the output shaft may be increased, decreased or maintained at the same speed as that of the crankshaft.

5. Apparatus as claimed in claim 4 wherein said control means includes a first, second and third control valve for controlling actuation of said first, second and third friction engaging means, respectively, a source of fluid under pressure, and a thermosensitive control means responsive to the temperature of said liquid for selectively moving said valves whereby said friction engaging means are selectively actuated.

6. A drive unit for transmitting rotative motion from an input shaft to an output shaft, said drive unit including a housing, an output shaft journaled in said housing for rotative motion and having one end extending therefrom into said housing, a first sleeve having one end splined to the said input shaft within said housing and the other end rotatably supporting the other end of said output shaft, an arm of said first sleeve extending radially thereof and supporting a first ring gear and a first pinion carrier having a first pinion journaled therein, a first sun gear in meshing engagement with said first planet pinion and secured to said output shaft for rotation therewith, a second sleeve secured to said output shaft for rotation therewith, said second sleeve having an arm extending radially therefrom and supporting a second pinion carrier having a second planet pinion journaled thereon, said second planet pinion being in meshing engagement with said first ring gear, a third sleeve rotatably supported on said output shaft, said third sleeve having a second sun gear secured thereto for rotation therewith, said second sun gear being in meshing engagement with said second planet pinion, a first brake for securing said second sleeve from rotating upon actuation thereof, a third sleeve rotatably mounted on said first sleeve, said third sleeve having an arm extending radially therefrom, a second ring gear in meshing engagement with said first planet pinion and supported on said arm, a clutch for securing said third sleeve to said first sleeve for rotation therewith upon actuation of said clutch, a second brake for securing said third sleeve from rotating upon actuation thereof, control means for selectively actuating said brakes and said clutch, said control means including a first valve operatively connected to said first brake for actuation thereof, a second valve operatively connected to said clutch for actuation thereof and a third valve operatively connected to said second brake for actuation thereof, biasing means for biasing said valves to closed position wherein said brakes and said clutch are not actuated, and a variable pressure valve for controlling pressure applied to said valves for movement thereof against the biasing action of said biasing means for selectively moving said valves to open position whereby said brakes and said clutch are actuated.

7. Apparatus as claimed in claim 6 wherein said biasing means comprise, a first, second and third compression spring for biasing said first, second and third valve, respectively, said first spring providing the smallest biasing force, said third spring providing the largest biasing force whereby as the pressure from the variable pressure valve is increased the springs of the valves will be overcome in the order of first, second and third valve for successively actuating the clutch and brakes of the drive unit in that order.

8. In a fan drive for driving an engine driven vehicle fan, an engine driven power input shaft, a power delivery shaft, a fan driven by said power delivery shaft, planetary gearing adapted to provide neutral or no-drive condition of operation, reduction drive, direct drive, and overdrive operation of said fan, fluid pressure responsive servos for selectively establishing said conditions of operation, a fluid pressure source, valve means for controlling the condition of operation of said planetary gearing connected to said source and to said servos, said valve means being effective in a first position to connect said servos to exhaust to establish said neutral condition of operation, means yieldably biasing said valve means to establish said neutral condition of operation, fluid pressure responsive means associated with said valve means for selectively positioning said valve means to direct fluid pressure from said source to selectively establish reduction drive, direct drive and overdrive conditions of operation, a pressure metering valve connected to said fluid pressure source and to said last-mentioned fluid pressure responsive means, and temperature responsive means operatively associated with said pressure metering valve for moving said pressure metering valve to increase the pressure delivered to said last-mentioned fluid pressure responsive means to change the planetary gearing drive ratio by which said fan is driven.

9. A fan drive and control as set forth in claim 8 including additional fluid pressure responsive means associated with said valve means, an engine driven governor connected to said fluid pressure source, and a governor pressure delivery passage connected to said additional fluid pressure responsive means, said additional fluid pressure responsive means being responsive to governor pressure to prevent said valve means from establishing overdrive condition of operation at engine speeds above a predetermined engine speed.

10. In a fan drive for driving an engine driven fan, an engine driven shaft, a fan drive shaft, a planetary transmission adapted to provide neutral, reduction drive, direct drive and overdrive of said fan drive shaft, a fan driven by said fan drive shaft, means for establishing reduction drive in said transmission including a fluid pressure responsive reduction drive brake servo, means for establishing direct drive through said transmission including a fluid pressure responsive direct drive clutch servo, means for establishing overdrive in said transmission including a fluid pressure responsive overdrive brake servo, a fluid pressure source, a reduction drive shift valve connected to said source, a reduction brake supply passage connecting said shift valve to said reduction drive brake servo, spring means yieldably biasing said shift valve to connect said reduction brake supply passage to exhaust, a direct drive clutch control valve connected to said source, a direct drive clutch supply passage connecting said direct drive clutch control valve to said direct drive clutch servo, spring means yieldably biasing said direct drive clutch control valve to connect said direct drive clutch supply passage to exhaust, an overdrive brake control valve connected to said source, an overdrive brake pressure delivery passage connecting said overdrive brake control valve to said overdrive brake servo, spring means for biasing said overdrive control valve to connect said overdrive brake pressure delivery passage to exhaust, a pressure metering valve connected to said source and adapted to deliver variable pressure to a control signal passage connected to each of said control valves, spring means yieldably biasing said pressure metering valve to connect said control signal passage to exhaust, temperature responsive means for positioning said pressure metering valve to progressively increase the pressure in said control signal passage in response to rise of temperature of said temperature responsive means, fluid pressure responsive means associated with each of said control valves, respectively, and responsive to pressure in said control signal passage for moving said valves, sequentially, to deliver pressure from said source to said reduction brake supply passage, said direct drive clutch supply passage and to said overdrive brake supply passage, respectively, in the order named, second fluid pressure responsive means associated with said reduction drive shift value and responsive to pressure delivered to said direct drive clutch supply passage for moving said reduction drive shift valve to connect said reduction brake supply passage to exhaust, third fluid pressure responsive means associated with said reduction drive shift valve and responsive to pressure delivered to said overdrive brake pressure delivery passage for positioning said reduction drive shift valve to connect said reduction brake supply passage to exhaust, and fourth fluid pressure responsive means associated with said direct drive clutch control valve and responsive to pressure in said overdrive brake supply passage for positioning said direct drive clutch control valve to connect said direct drive clutch supply passage to exhaust.

11. A fan drive and control as set forth in claim 10 including additional fluid pressure responsive means associated with said overdrive control valve, an engine driven governor connected to said fluid pressure source, and a governor pressure delivery passage connected to said additional fluid pressure responsive means, said additional fluid pressure responsive means being responsive to governor pressure to prevent said overdrive control valve from establishing overdrive operation at engine speeds above a predetermined engine speed.

12. In a fan drive for driving a fan for cooling an engine, an engine driven power input shaft, a power delivery shaft, a fan driven by said power delivery shaft, panetary gearing for transmitting torque between said shafts, a first brake effective when engaged to establish reduction drive through said gearing, a first fluid pressure responsive brake servo for engaging said first brake, a clutch effective when engaged to establish direct drive through said gearing, a fluid pressure responsive clutch servo for engaging said clutch, a second brake effective when engaged to establish overdrive through said gearing, a second fluid pressure responsive brake servo for engaging said overdrive brake, a fluid pressure source, a first brake control valve connected to said source for controlling admission of pressure to an exhaust of pressure from said first brake servo, spring means normally biasing said first brake control valve to connect said first brake servo to exhaust, a direct drive clutch valve connected to said source for controlling the admission of pressure to and exhaust of pressure from said direct drive clutch servo, spring means biasing said direct drive clutch valve to connect said clutch servo to exhaust, an overdrive brake control valve connected to said source for controlling the admission of pressure to an exhaust of pressure from said overdrive brake servo, spring means biasing said overdrive brake control valve to connect said overdrive brake servo to exhaust, a first brake pressure delivery passage connecting said engaging said direct drive clutch, said second fluid pressure responsive means of said first brake control valve being responsive to pressure from said direct drive clutch passage to position said first brake control valve to connect said first brake servo to exhaust thereby disengaging said first brake when said direct drive clutch is engaged, said overdrive control valve being movable in response to an additional rise of pressure in said metering valve pressure delivery passage to deliver pressure to said overdrive brake delivery passage to said overdrive brake servo for engaging said overdrive brake, a third fluid pressure responsive means associated with said first brake control valve and connected to said overdrive pressure delivery passage for positioning said first brake control valve to connect said first brake servo to exhaust when fluid pressure is delivered to said overdrive pressure delivery passage thereby disengaging said first brake when said overdrive brake is engaged, and a fourth fluid pressure responsive means associated with said direct drive clutch control valve and connected to said overdrive pressure delivery passage for positioning said direct drive clutch valve to connect said direct drive servo to exhaust when pressure is delivered to said overdrive pressure delivery passage by said overdrive brake control valve thereby disengaging said direct drive clutch when said overdrive brake is engaged.

13. A fan drive and control as set forth in claim 12 including additional fluid pressure responsive means associated with said overdrive control valve, an engine driven governor connected to said fluid pressure source, and a governor pressure delivery passage connected to said additional fluid pressure responsive means, said additional fluid pressure responsive means being responsive to governor pressure to prevent said overdrive control valve from establishing overdrive operation at engine speeds above a predetermined engine speed.

14. A control system for controlling the speed of a cooling fan including a rotatable input shaft, means for rotating said input shaft, an output shaft, a fan secured to said output shaft, gear means for operably interconnecting said shafts for transmitting rotational movement of said input shaft to said output shaft, said gear means including first and second gear sets, each of said gear sets having one element thereof driven by said input shaft and rotatable as a unit with said input shaft, each of said gear sets having a second element thereof rotatable as a unit with said output shaft, brake means effective when engaged to establish reduction drive, clutch means effective when engaged to establish direct drive, second brake means effective when engaged to establish overdrive, fluid pressure responsive servos for engaging each of said brake means and said clutch means, respectively, a fluid pressure source, shift valve means connected to said source and to said servo, means for positioning said shift valve means to connect said fluid pressure responsive servos to exhaust to thereby establish neutral, additional fluid pressure responsive means for moving said shift valve means, a pressure metering valve connected to said source and to said additional fluid pressure responsive means, and temperature responsive means for increasing the pressure delivered by said pressure metering valve in response to rise in temperature, said shift valve means being movable in response to rise of pressure from said pressure metering valve to establish reduction drive, direct drive and overdrive in the order named.

15. An accessory drive for driving the accessories of a vehicle engine comprising, a planetary gear transmission adapted to provide neutral, reduction drive, direct drive and overdrive conditions of operation, said transmission including a power input shaft, a power output shaft, and first and second gear units, said first gear unit including a first planet carrier driven by said power input shaft and supporting a first planet pinion in mesh with a first read gear and a first sun gear, said first sun gear being rotatable as a unit with said power delivery shaft, a first engageable and releasable brake for braking said first ring gear against rotation, a fluid pressure responsive servo for engaging and releasing said first brake, a clutch effective when engaged to clutch said first ring gear to said first planet carrier, a fluid pressure responsive servo for engaging and releasing said clutch, said second gear unit including a second planet carrier fixed for rotation as a unit with said output shaft and supporting a second planet pinion gear in mesh with a second ring gear fixed for rotation as a unit with said first carrier and a second sun gear, a second engageable and releasable brake for braking said second sun gear, a fluid pressure responsive servo for engaging and releasing said second brake, a fluid pressure source, shift valve means connected to said source and to said servos for controlling the admission of fluid pressure to and exhaust of pressure from said source, means yieldably biasing said shift valve means to connect said servos to exhaust to thereby establish neutral condition of operation, a pressure metering valve connected to said source and adapted to deliver fluid at variable pressures, fluid pressure responsive means associated with said shift valve means and connected to said pressure metering valve for receiving variable pressures delivered thereby, said fluid pressure responsive means being effective to move said shift valve means to direct pressure from said source to said transmission servos to establish reduction drive, direct drive and overdrive, respectively, in the order named in response to rise of pressure delivered by said pressure metering valve and temperature responsive means for moving said pressure metering valve to increase the pressure delivered by said valve in response to rise of temperature.

References Cited

UNITED STATES PATENTS

| 1,409,536 | 3/1922 | Firth | 74—761 |
| 2,418,378 | 4/1947 | Voytech | 74—761 |
| 2,454,696 | 11/1948 | Highberg | 123—41.12 |
| 2,658,400 | 11/1953 | Dodge. | |
| 2,713,800 | 7/1955 | Forster. | |
| 2,903,083 | 9/1959 | Kelley. | |
| 2,929,272 | 3/1960 | Miller | 74—760 |
| 2,981,122 | 4/1961 | Kelley | 74—752 |
| 3,023,638 | 3/1962 | Westbury et al. | 74—752 |
| 3,129,610 | 4/1964 | Ashfield. | |
| 3,221,721 | 12/1965 | Kuze | 123—41.12 |
| 3,270,588 | 9/1966 | Bowen et al. | 74—750 |

DONLEY J. STOCKING, *Primary Examiner.*

THOMAS C. PERRY, *Examiner.*

UNITED STATES PATENT OFFICE
CERTIFICATE OF CORRECTION

Patent No. 3,359,831                                                December 26, 1967

Milton H. Scheiter

It is hereby certified that error appears in the above numbered patent requiring correction and that the said Letters Patent should read as corrected below.

Column 1, line 70, for "values" read -- valves --; column 10, line 38, for "value" read -- valve --; column 12, line 17, for "read" read -- ring --.

Signed and sealed this 11th day of March 1969.

(SEAL)
Attest:

Edward M. Fletcher, Jr.                                    EDWARD J. BRENNER

Attesting Officer                                                Commissioner of Patents

UNITED STATES PATENT OFFICE
CERTIFICATE OF CORRECTION

Patent No. 3,359,831 December 26, 1967

Milton H. Scheiter

It is certified that error appears in the above identified patent and that said Letters Patent are hereby corrected as shown below:

Column 11, line 15, after "said", first occurrence, insert -- first brake control valve to said first brake servo, a direct drive clutch delivery passage connecting said direct drive clutch valve to said direct drive clutch servo, an overdrive brake pressure delivery passage connecting said overdrive brake control valve to said overdrive brake control servo, a pressure metering valve connected to said pressure source and adapted to deliver variable control pressure to a metering valve control pressure delivery passage, fluid pressure responsive means associated with each of said valves and connected to said metering valve control pressure delivery passage, temperature responsive means for controlling said pressure metering valve to increase the pressure delivered to said metering valve control pressure delivery passage in response to rise of temperature of said temperature responsive means, said first brake control valve being movable in response to a predetermined rise of pressure in said metering valve control pressure delivery passage to deliver pressure from said source to said first brake pressure delivery passage to said first brake servo for engaging said first brake, a second fluid pressure responsive means associated with said first brake control valve connected to said direct drive clutch delivery passage, said direct drive clutch control valve being movable in response to a further predetermined rise of pressure in said metering valve control pressure delivery passage to deliver pressure from said source to said direct drive clutch delivery passage to said direct drive clutch servo for --

Signed and sealed this 7th day of April 1970.

(SEAL)
Attest:

EDWARD M. FLETCHER, JR.
Attesting Officer

WILLIAM E. SCHUYLER, JR.
Commissioner of Patents